United States Patent
Treadway (10) Patent No.: US 12,511,722 B2
(45) Date of Patent: Dec. 30, 2025

(54) ARRANGING DIGITAL IMAGES

(71) Applicant: Sphere Research Ltd, London (GB)

(72) Inventor: Oliver Treadway, London (GB)

(73) Assignee: Sphere Research Ltd, London (GB)

( * ) Notice: Subject to any disclaimer, the term of this patent is extended or adjusted under 35 U.S.C. 154(b) by 291 days.

(21) Appl. No.: 18/472,788

(22) Filed: Sep. 22, 2023

(65) Prior Publication Data
US 2024/0013349 A1 Jan. 11, 2024

Related U.S. Application Data (63) Continuation of application No. PCT/EP2022/057537, filed on Mar. 22, 2022.

(30) Foreign Application Priority Data

Mar. 23, 2021 (GB) ..................... 2104013

(51) Int. Cl.
*G06T 5/70* (2024.01)
(52) U.S. Cl.
CPC ..................... *G06T 5/70* (2024.01)
(58) Field of Classification Search
CPC ......... G06T 5/70; G06T 11/60; G06T 3/4038; G06T 3/60; G06T 7/30; G06T 2200/04;
(Continued)

(56) References Cited

U.S. PATENT DOCUMENTS 5,204,944 A * 4/1993 Wolberg ............... G06T 3/18
382/277
6,326,964 B1 * 12/2001 Snyder ............... G06T 13/80
345/419
(Continued)

FOREIGN PATENT DOCUMENTS

EP 0526918 A2 * 2/1993 ............... G06T 3/08

OTHER PUBLICATIONS

"Owlcation: ""Calculating the Centroid of Compound Shapes Using the Method of Geometric Decomposition"" https://owlcation.com/stem/How-to-Solve-Centroids-of-Compound-Shapes", Dec. 31, 2019.
(Continued)

*Primary Examiner* — Jose L Couso
(74) *Attorney, Agent, or Firm* — EIP US LLP (57) ABSTRACT

A method of processing a set of images to determine a spatial arrangement for the set of images includes, for each of the images: obtaining data indicative of a respective initial position of the image; processing the image to identify one or more subregions; determining an area and a centroid of each subregion; determining, for each subregion, a respective weight value depending on the determined area of that subregion; determining a position of an anchor point in dependence on the weight values and positions of the centroids of the subregions; and determining a respective offset direction from the anchor point to a centre of the image; and transposing the images from the respective initial positions in the respective offset directions. The transposing of the images from the initial positions of the images determines the spatial arrangement for the set of images.

20 Claims, 10 Drawing Sheets

(58) Field of Classification Search
CPC ......... G06T 2200/32; G06T 3/02; G06T 3/08; G06T 3/18; G06T 7/73; G06T 2207/10012; G06V 20/10; G06V 2201/07
See application file for complete search history.

(56) References Cited

U.S. PATENT DOCUMENTS

| | | |
|---|---|---|
| 8,135,182 B2 | 3/2012 | Luo et al. |
| 9,418,460 B2 | 8/2016 | Nicholson et al. |
| 2002/0095439 A1 | 7/2002 | Long et al. |
| 2014/0010461 A1 | 1/2014 | Sugai |
| 2015/0098664 A1 | 4/2015 | Minamihara et al. |

OTHER PUBLICATIONS

GB Search Report dated Aug. 27, 2021 for Application No. GB2104013.4.
International Search Report and Written Opinion dated Aug. 4, 2022 for PCT Application No. PCT/EP2022/057537.

* cited by examiner

ARRANGING DIGITAL IMAGES

CROSS-REFERENCE TO RELATED APPLICATIONS

This application is a continuation under 35 U.S.C. § 120 of International Application No. PCT/EP2022/057537, filed Mar. 22, 2022, which claims priority to GB Application No. 2104013.4, filed Mar. 23, 2021, under 35 U.S.C. § 119(a). Each of the above-referenced patent applications is incorporated by reference in its entirety.

BACKGROUND

Technical Field

The present disclosure relates to determining a spatial arrangement for a set of digital images for display by a display device. The disclosure has particular, but not exclusive, relevance to the arranging of digital images representing objects for display within a graphical user interface (GUI).

Background

A graphical user interface (GUI) is a software component used to display information to a user of an electronic device such as a computer, smart TV or smartphone, to facilitate interaction between the user and the device. A GUI typically presents the user with an arrangement of objects such as icons and thumbnail images, at least some of which are interactive, such that when a user hovers over or clicks on the object using a cursor controlled by an input device, a visible change or processing routine is triggered. The arrangement of objects within a GUI may be determined manually by a human designer, or may be automated using sorting rules, packing algorithms and the like. An example of a GUI in which objects may be arranged automatically is a web page in which objects representing products or other items of interest are arranged in response to a user query and/or user preferences, for rendering by a web browser.

When objects are arranged automatically for display within a GUI, the objects are typically positioned in dependence on the size and shape of the images containing the objects. This can result in an irregular arrangement of the objects, for example if the objects are not perfectly centred within the images, or where a single image contains multiple objects. Such an arrangement may detract from the functionality of the GUI.

SUMMARY

According to a first aspect of the present disclosure, there is provided a computer-implemented method of processing a set of images to determine a spatial arrangement for the set of images for display by a display device. The method includes obtaining data indicative of a respective initial position within an image plane of each image in the set, and performing a process for each image in the set. The process includes processing the image to identify one or more subregions of the image, determining an area and a centroid of each of the identified one or more subregions of the image, and determining a respective weight value for each of the determined one or more subregions of the image in dependence on the respective area of that subregion of the image. The processing routine further includes determining a position of an anchor point within the image in dependence on the weight values and positions of the centroids of the one or more subregions, and determining a respective offset direction from the determined anchor point to a centre of the image. The method further includes transposing the images in the set from the respective initial positions of the images in the respective offset directions. The transposing of the images from the respective initial positions of the images determines the spatial arrangement for the set of images.

By identifying subregions of the image and determining the spatial arrangement for the set of images in dependence on the areas and positions of the identified subregions, the spatial arrangement takes into account the characteristics of the subregions, rather than simply the sizes and shapes of the images themselves. The subregions may correspond, for example, to objects appearing within the image, in which case the resulting spatial arrangement is likely to be suitable in cases where a single image includes multiple objects, or where objects are not properly centred within the image.

The anchor point within each image may be determined as an average position of the centroids of the identified one or more subregions of the image, weighted by the weight values of the determined one or more subregions of the image. In this way, the position of the anchor point is drawn towards each of the identified subregions, and is proportionately more affected by subregions having larger weight values. The weight value of a subregion depends on the area of the subregion, such that larger subregions have a greater effect on the position of the anchor point, but may additionally depend on other factors such as a colour density, providing flexibility to determine how the arrangement of the images is affected by brightness, colour, or other visual aspects of objects within the images.

In examples, one or more of the images in the set is a rasterised image. For each image, the one or more subregions of the image are identified in dependence on pixel values of pixels within the image, and each of the one or more subregions includes a respective pixel cluster containing a subset of the pixels within the image. The respective weight value for each of the identified one or more subregions may then depend on the pixel values of at least some of the pixels within said respective pixel cluster. In cases where the images are rasterised, as opposed to being stored in a vector image format, determining subregions for the purpose of the present invention introduces additional technical challenges, as there is no predetermined grouping of pixels corresponding to objects within the images. Therefore, a method is provided in which determining a subregion of the image includes converting the image to a quantised monochrome image containing pixels restricted to having a predetermined number of monochrome pixel values (for example two), and grouping neighbouring pixels having a same monochrome pixel value. As a result, pixels having a similar appearance to one another will be grouped together, allowing the method to automatically pick out individual objects or parts of objects. By changing the number of monochrome pixel values, and/or quantisation thresholds, different groupings may be achieved, providing flexibility for subregions having differing appearances to be treated differently from one another.

Identifying a subregion of a rasterised image may include determining a convex hull of a pixel cluster, in which case the area of the first subregion may be defined as an area of the convex hull of that pixel cluster. The convex hull of a pixel cluster is the smallest convex polygon containing the entire pixel cluster. The convex hull contains all of the pixels within the pixel cluster, as well as any intervening space enclosed by the pixel cluster or otherwise extending into the pixel cluster. Subregions defined in this way thus result in comparable weight values being associated with objects filling similar sized regions of space. Computing an area and centroid of a polygon such as a convex hull is computationally straightforward using known formulae and results in low processing demands, which may be important for example where the method is applied in real time during rendering of a dynamic GUI.

The transposing of the images may be performed in a single step, as opposed to being performed separately for each image in the set. The transposing of all of the images may for example be performed in response to a single user input action or other prompt, and may resulting in output data indicative of the final positions of all of the images in the set (or a composite image comprising all of the images in the set in their final spatial arrangement). The final spatial arrangement of the images may be determined with little or no user intervention, allowing the method to be applicable in dynamic settings such as where a GUI is populated in response to user input such as a search query, rather than being designed in advance by a human user. Transposing the images in a single step may also facilitate the use of automatic collision avoidance techniques whereby the overlapping of images and/or objects within the images can be avoided in the final spatial arrangement.

In some arrangements, each image in the set is transposed or moved until the anchor point of that image is located at the initial position of the centre of that image. Such an arrangement may be considered optimal with respect to the positions of the identified subregions of the image, with each of the images centred in dependence on the positions and weightings of the identified subregions. However, it may not be possible or desirable for all of the images to be offset to this extent, for example because the resulting arrangement leads to an overlapping of images or objects within the images, which may be unacceptable for certain applications such as within a GUI. Therefore, in some examples, at least some of the images are transposed by a distance depending on user input indicating an offset factor, providing the user with control and the ability to avoid unacceptable collisions or proximity between objects. In other examples, automatic collision avoidance methods are applied. For example, the images in the set may be transposed incrementally and simultaneously, and the incremental transposing of any two of the images may be ceased when a minimum distance between subregions of those two images is less than a threshold distance.

According to a second aspect of the present disclosure, there is provided a system including processing circuitry and memory circuitry. The memory circuitry is arranged to hold a set of images, data indicative of a respective initial position of each image of the set of images within an image plane, and machine-readable instructions. When the machine-readable instructions are executed by the processing circuitry, the system performs a processing routine for each image in the set, in order to determine a spatial arrangement of the set of images for display by a display device. The processing routine includes processing the image to identify one or more subregions of the image, determining an area and a centroid of each of the identified one or more subregions of the image, and determining a respective weight value for each of the determined one or more subregions of the image in dependence on the respective area of that subregion of the image. The processing routine further includes determining a position of an anchor point within the image in dependence on the weight values and positions of the centroids of the one or more subregions, determining a respective offset direction from the determined anchor point to a centre of the image, and transposing the images from the respective initial positions of the images in the respective offset directions. The transposing of the images from the respective initial positions of the images determines the spatial arrangement for the set of images.

Further features and advantages will become apparent from the following description of preferred embodiments, given by way of example only, which is made with reference to the accompanying drawings.

DETAILED DESCRIPTION

Embodiments of the present disclosure relate to determining a spatial arrangement for a set of images for display by a display device. In particular, embodiments described herein address challenges related to arranging a set of images representing objects for display within a GUI.

Figure 1:
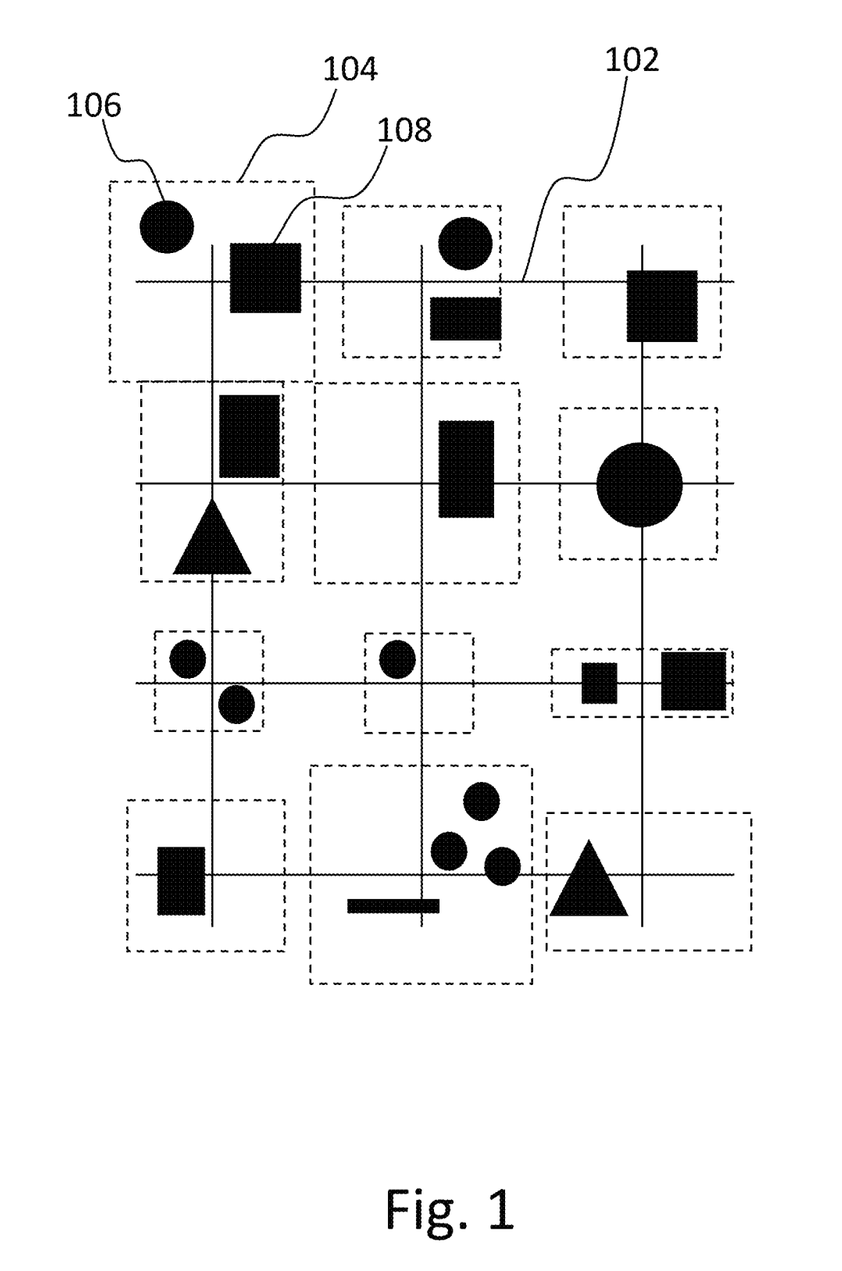
FIG. 1 shows an example of positioning of a set of images each representing one or more objects.
Figure 2:
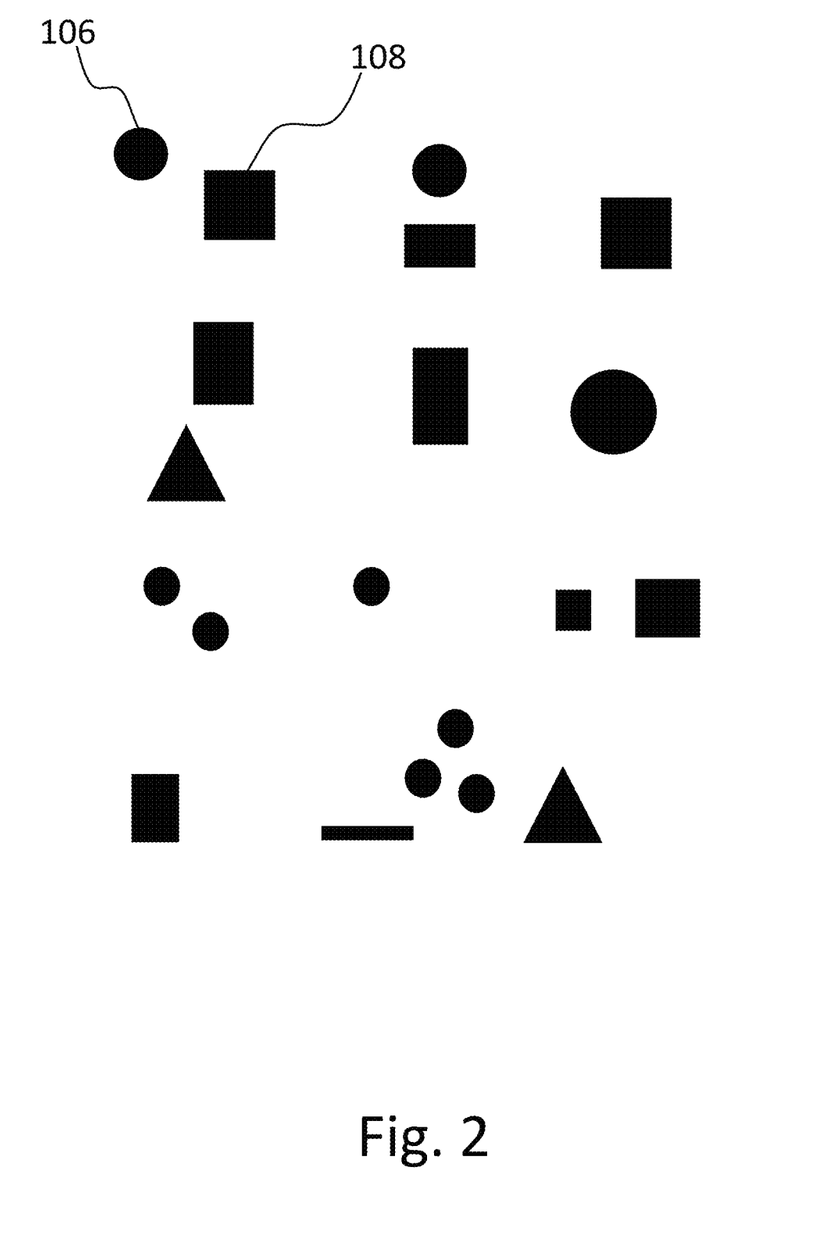
FIG. 2 shows a first arrangement of the objects, resulting from the positioning of the images of FIG. 1.

FIG. 1 shows an example of a set of 12 images, each image having a border, otherwise referred to as a bounding polygon, represented by a dashed box. The images are positioned such that the centre of each image lies on a vertex of a square grid 102, represented in FIG. 1 using solid lines. The images are of differing sizes and shapes, and each of the images contains one or more objects (shown for illustrative purposes as solid squares, rectangles, triangles, and circles). For example, the image 104 contains two objects: a circular object 106 and a square object 108. FIG. 2 shows the same set of images in the same positions as in FIG. 1, but without the borders of the images or the gridlines of the square grid 102. Even though each of the images is centred with respect to a vertex of the square grid 102, it is observed from FIG. 2 that the arrangement of the objects may not, and indeed in this example does not, appear regular. Reasons for this include some of the objects not being centred within an image, and some of the images containing more than one object. In the context of a GUI for a software application, it is noted that many common user actions, for example using an input device to move a cursor between objects or highlight multiple objects, are facilitated by the objects having a regular arrangement. An arrangement of objects as shown in FIG. 2 may therefore be considered suboptimal in terms of the functionality of the GUI.

Figure 3:
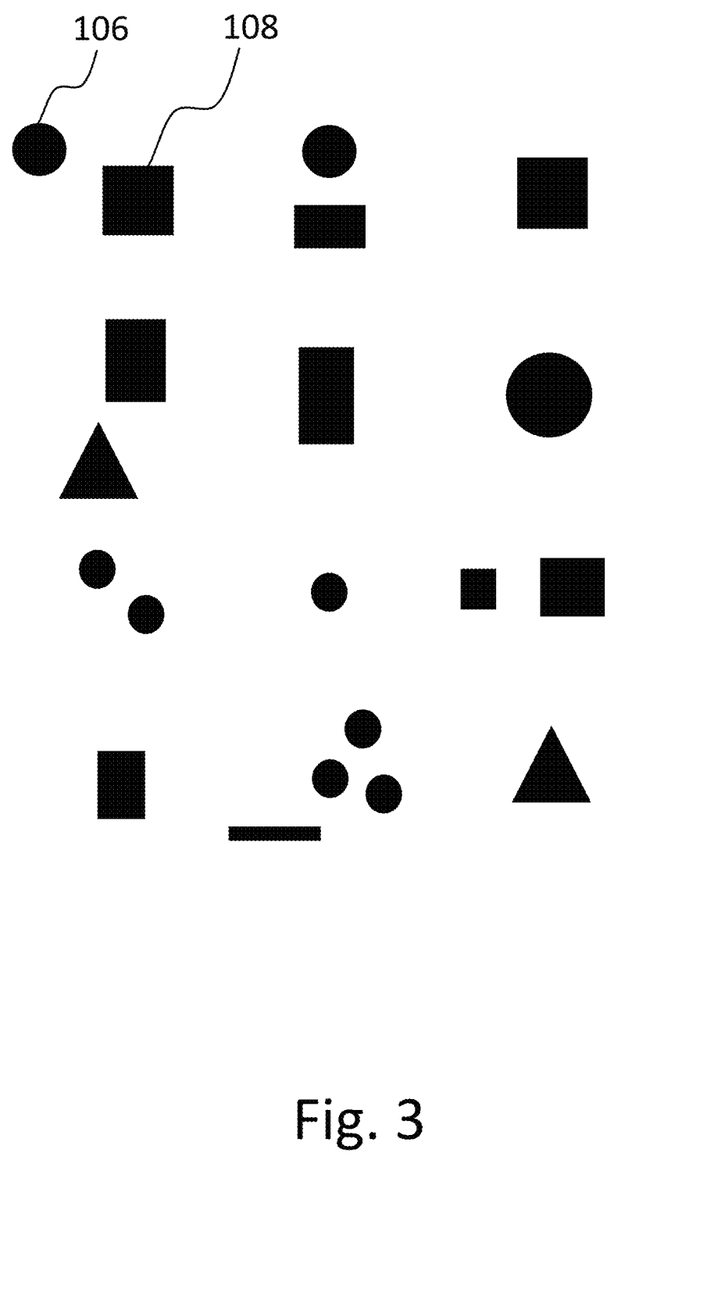
FIG. 3 shows a second arrangement of the objects of FIG. 1.
Figure 4:
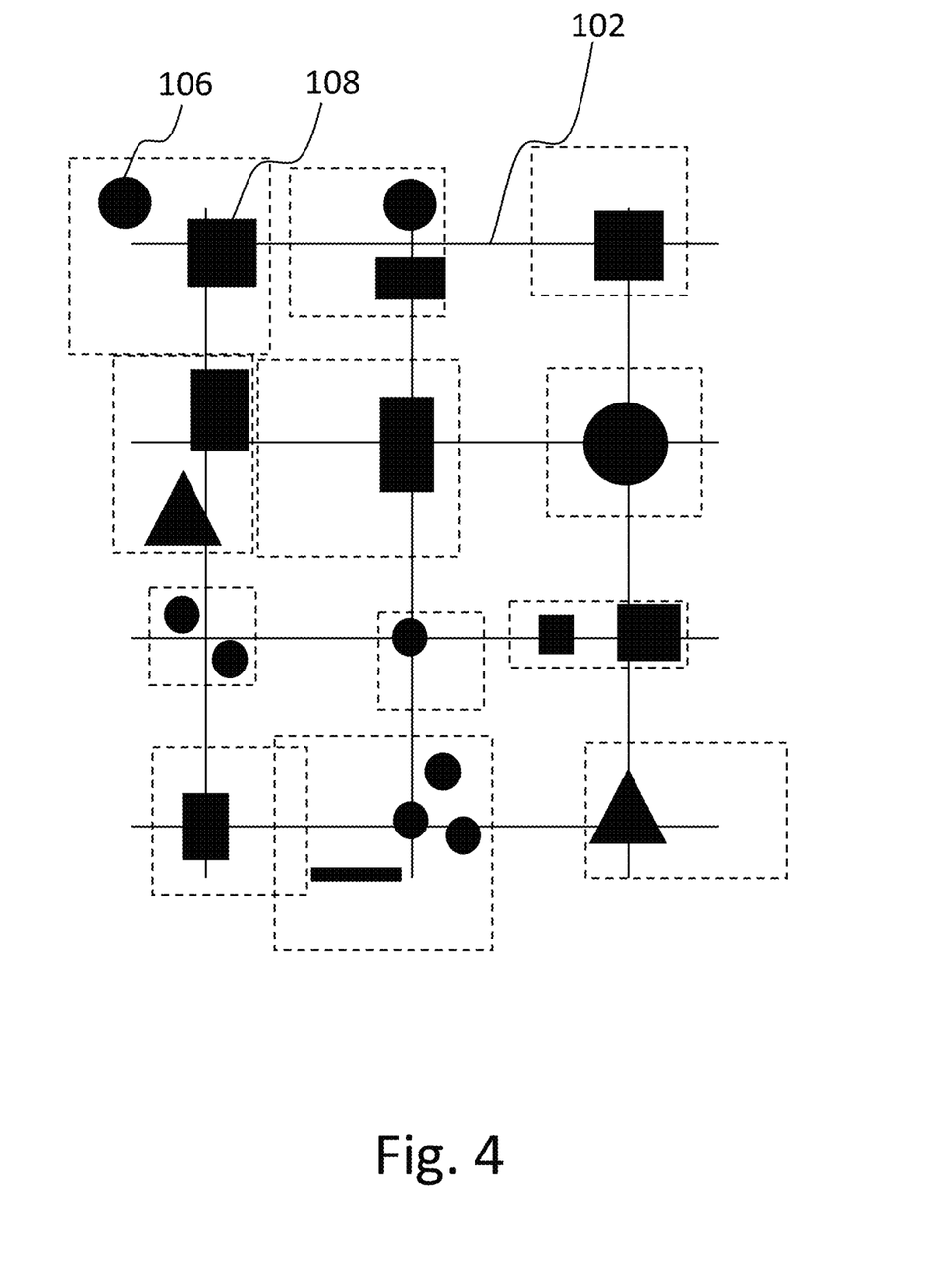
FIG. 4 shows a positioning of the set of images of FIG. 1 resulting in the second arrangement of objects, as shown in FIG. 3.

FIG. 3 shows an alternative arrangement of the objects of FIG. 1, and FIG. 4 shows the positioning of the images corresponding to the arrangement of FIG. 3. In this example, the images are positioned at the same vertices of the square grid 102 as in FIG. 1, but some of the images are offset relative to the positions of the images in FIG. 1. It is observed that, compared with the arrangement of objects shown in FIG. 2, the arrangement of objects in FIG. 3 appears more regular.

Figure 5:
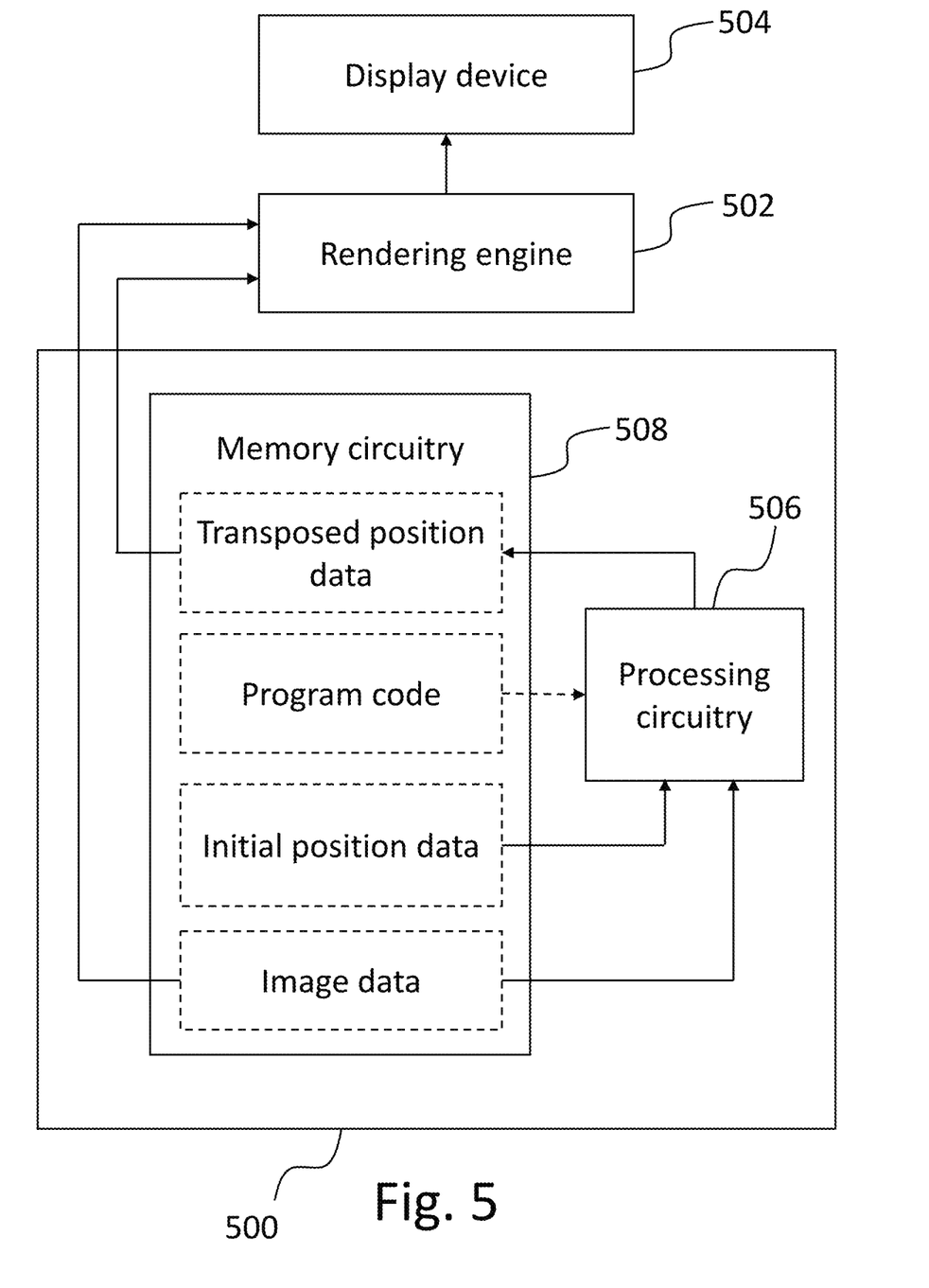
FIG. 5 shows an example of a data processing system arranged to perform processing routines in accordance with the present disclosure.

FIG. 5 shows an example of a data processing system 500 arranged to determine a spatial arrangement for a set of images in accordance with the present disclosure. In this example, the system 500 is a server device arranged to communicate with client devices over a network. In other examples, the functions of the system 500 could be performed by a personal device such as a desktop computer, laptop computer, tablet, or smartphone, or by a virtual server system distributed over several computing nodes providing a cloud-based service. The system 500 is connected to a rendering engine 502, which is arranged to render a GUI for display on a display device 504 in accordance with data received from the system 500. In this example, the rendering engine 502 and display device 504 are parts of a user device connected to the system 500 over a network, though in other examples, such as when the functions of the system 500 are performed by a personal device, the rendering engine 502 and the display device 504 may be part of that same personal device. The display device 504 may be a planar flat-screen display, or alternatively could be a curved display, a projector, a display of a virtual reality headset or an augmented reality headset, or any other device capable of presenting a GUI for viewing by a user. In some examples, the rendering engine 502 may present a set of objects on a surface of a three-dimensional structure. An example of such a GUI is discussed in international patent publication WO 2011/151367 A1, in which objects are presented on a curved interior surface of a three-dimensional structure such as a sphere. The user is provided with controls to rotate the three-dimensional structure and to zoom into the surface, in order to view objects on different portions of the surface.

The system 500 includes processing circuitry 506 and memory circuitry 508. The processing circuitry 506 may include any suitable arrangement of processing units, gate arrays, and alike, for example including a central processing unit (CPU) along with one or more specialised processing units for image processing applications, such as a graphics processing unit (GPU). Other processing circuitry may be included in addition to, or as an alternative to, the processing units mentioned above, for example an artificial intelligence accelerator or neural processing unit (NPU), an application-specific standard product (ASSP), an application-specific integrated circuit (ASIC), and/or one or more gate arrays such as a field-programmable gate array (FPGA). The memory circuitry 508 includes non-volatile storage along with working memory such as random-access memory (RAM) including static random access memory (SRAM), dynamic random-access memory (DRAM) and synchronous dynamic random-access memory (SDRAM).

The memory circuitry 508 holds program code which, when executed by the processing circuitry 506, causes the system 500 to perform a method in accordance with the present disclosure. The memory circuitry 508 further holds image data corresponding to a set of one or more digital images, along with initial position data indicating an initial spatial arrangement of the one or more images. The images may be colour images or greyscale images, and may be stored in any digital image format, for example a vector graphics format or a rasterised format. A vector graphics format uses code snippets to define geometries, colours and other visual characteristics of objects within the image. An image stored in a vector graphics format is rasterised during rendering of the image for display. An image represented in a rasterised image format consists of data representative of an array of pixels each having one or more pixel values. Multiple pixel values are required for each pixel in the case of a colour image, representing different colour components encoded in a suitable colour format, for example RGB or YUV colour format. Irrespective of the format of the digital image, each image may represent one or more objects for displaying within a GUI, and may further include a white or coloured background filling regions between or surrounding the one or more objects. The images may be rectangular or square, or may be cropped for example to the shape of particular objects. At least some of the objects may be associated with interactive behaviour, for example such that when the objects are presented within the GUI, hovering over or clicking on the object with a cursor causes a visible change or processing routine to be triggered. In an example of a GUI in which objects represent products available for sale, clicking on an object may enlarge or otherwise visually modify the object, and/or may cause the GUI to provide additional information about the product, for example a price and description of the product.

The initial position data indicates a position for each of the images with respect to a set of co-ordinates defining an image plane, for example in which a centre of each of the images is allocated to a respective vertex of a grid such as a square grid, rectangular grid, hexagonal grid, or any other regular or irregular grid. For images which are neither square nor rectangular, the centre is not uniquely defined, and the centre may be taken as the centre of a smallest bounding polygon for the image (for example a smallest bounding box for the image), or alternatively as the centroid of the image, which is the arithmetic mean of the position of all points within the image. The initial allocation of positions may be determined by a human designer, or may be determined automatically for example in dependence on properties of the images such as the size and shape of the images, and/or depending on metadata indicative of characteristics of objects appearing within the images. In an example where the objects represent products, the initial positioning of the images may depend on characteristics associated with the product, for example price or category of product. In some examples, the initial positions are determined using a packing algorithm such as one of the algorithms described in international patent publication WO 2011/151367 A1. Methods for automatically allocating positions of images based on sizes and shapes of the images, and/or metadata associated with the images, typically result in a positioning of images that does not take into account the appearance of the objects within the images, for example locations of objects and whitespace within the images, or the pixel properties of the objects. The resulting positioning may not be optimal from the perspective of user experience, for the reasons given above.

The memory 508 is arranged to further hold transposed position data representing a spatial arrangement for the set of images after the methods described herein have been applied. The system 500 is arranged to send the image data and the transposed position data to the rendering engine 502, for example when accessed as web resources using a web browser or dedicated software application. The rendering engine 502 is arranged to render the images for display on the display device 504, in accordance with the transposed position data.

Figure 6:
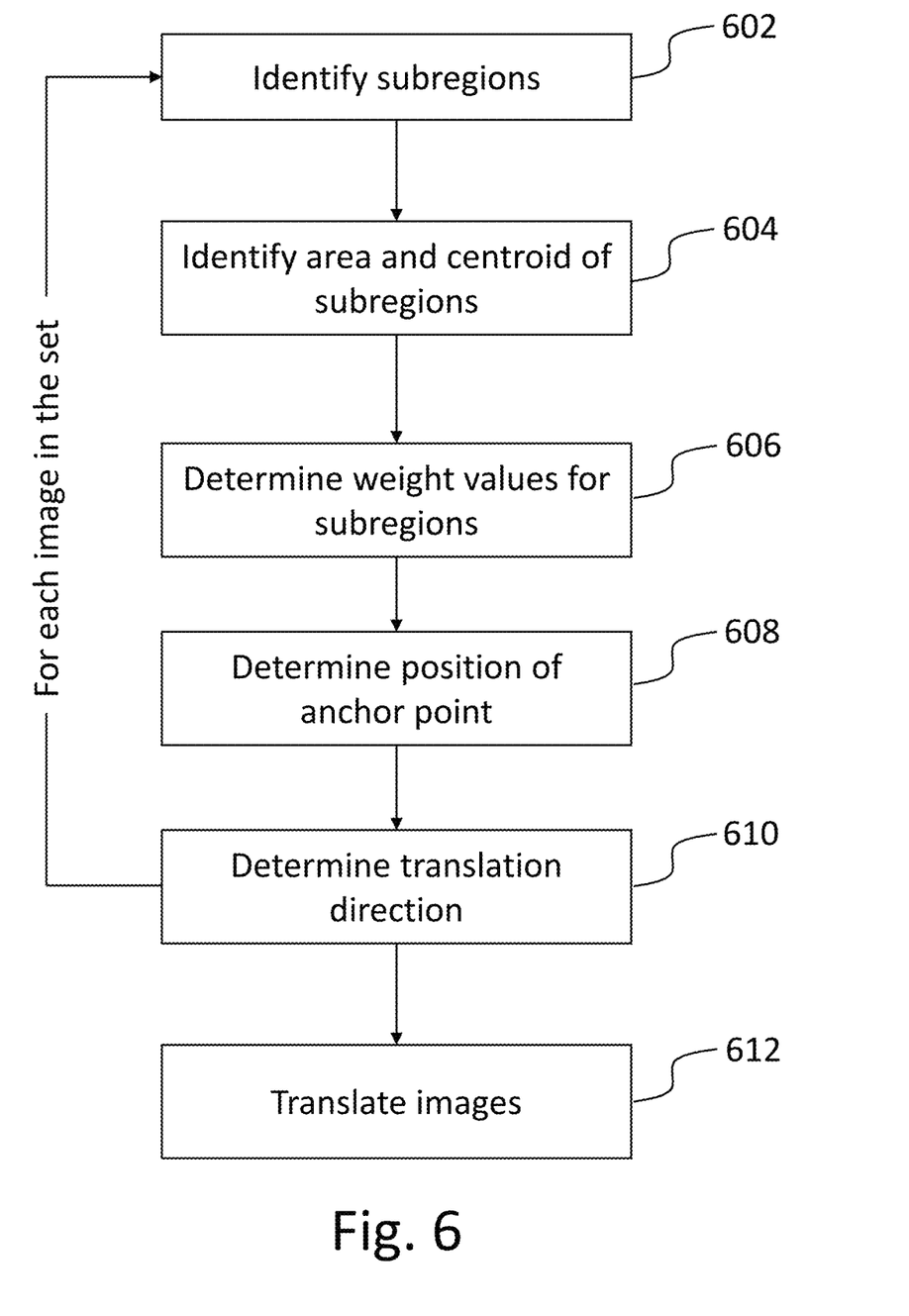
FIG. 6 shows an example of a method of determining a spatial arrangement of a set of images in accordance with the present disclosure.
Figure 7:
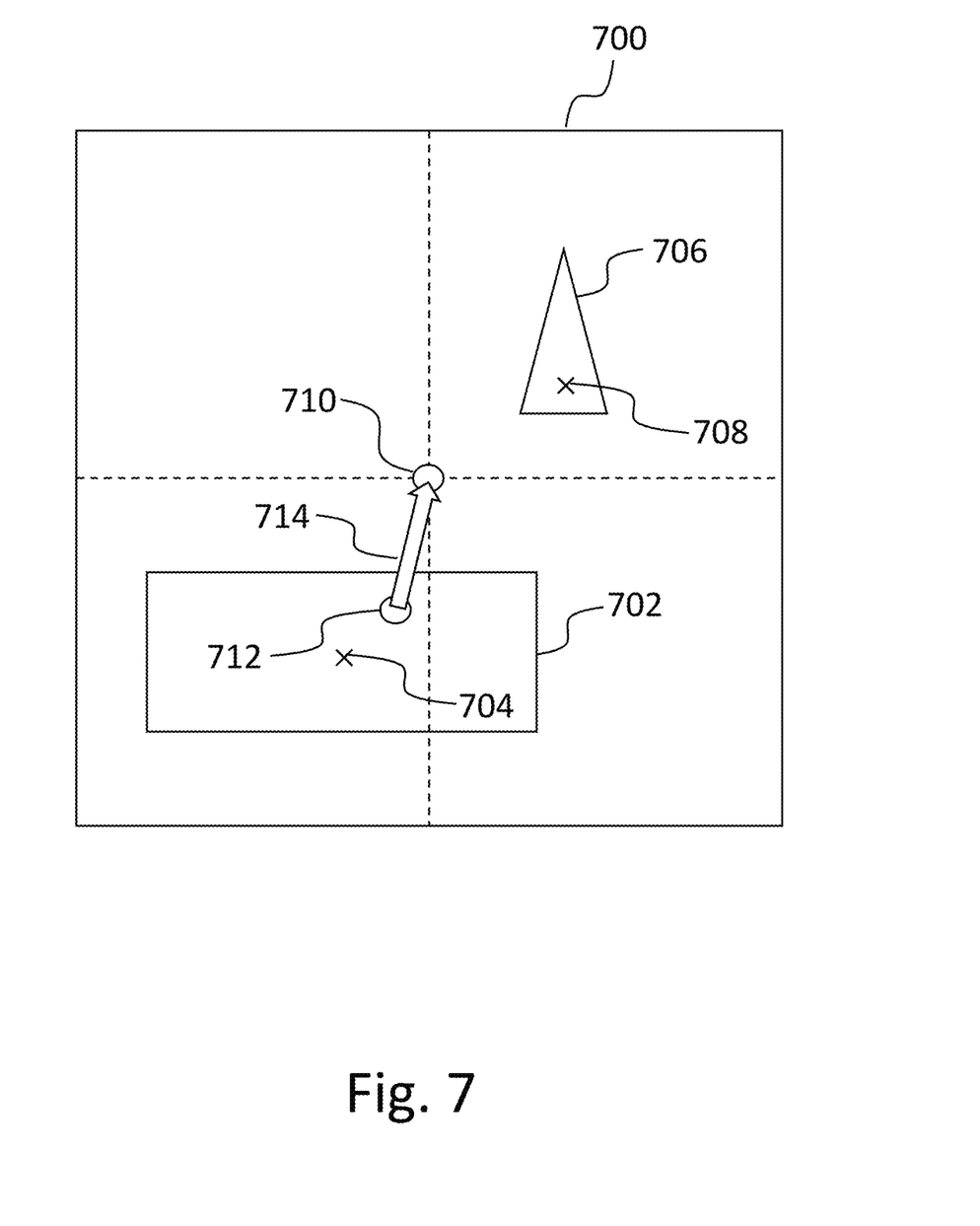
FIG. 7 illustrates schematically a first example of an offsetting of an image representing two objects in accordance with the present disclosure.

FIG. 6 shows an example of a method performed by the data processing system 500 of FIG. 5 in order to determine a spatial arrangement for a set of images stored in the memory 502. The system 500 processes, at 602, one of the images to identify one or more subregions of that image. Each subregion consists of a contiguous portion of the image in which the colour and/or brightness is congruous relative to other portions of the image. For an image stored in a vector graphics format, a subregion may correspond to a single vector element defined by a single code snippet, or may correspond to multiple elements that are contiguous with one another and of the same or similar colours to one another. For an image stored in a rasterised format, subregions may be identified in dependence on the pixel values of pixels within the image, such that each subregion includes a pixel cluster containing a contiguous subset of the pixels within the image, grouped together in dependence on the pixel values. Methods of grouping the pixels in dependence on pixel values are described in more detail hereafter. A subregion may be an area of a bounding polygon containing one or more vector elements or a pixel cluster, for example a convex hull of the one or more vector elements or pixel cluster. A convex hull of a subregion is defined as the smallest convex polygon (with no interior reflex angles) containing all of the points within the subregion. Methods for computing a convex hull of a given set of points are known, for example the Kirkpatrick-Seidel algorithm and Chan's algorithm, both of which achieve optimal scaling of processing resources with respect to the number of points in the given set (the number of floating point operations in both cases scale approximately linearly with the number of points in the set). Other suitable algorithms include the gift wrapping algorithm, the Graham scan, and the incremental convex hull algorithm.

In order to determine pixel clusters defining subregions of a rasterised image, the pixels of the image may be grouped based on colour and/or brightness, as derived from the pixel values of the pixels. Pixels within a given pixel cluster may, for example, have luminescence or radiance values lying within a given range bounded by upper and/or lower threshold values, and/or may be similar in colour, for example being within a same region of a table or array representing possible pixel colours. In other examples, pixel clusters may be determined using computer vision or machine learning techniques such as image segmentation. A specific example of a method of identifying subregions in the case of a rasterised image is described hereinafter with reference to FIG. 7.

The system 500 determines, at 604, an area and a centroid for each of the identified subregions of the image. The centroid or barycentre of a subregion is the arithmetic mean, or informally the average, position of all of the points within that subregion. A general formula is known for computing the centroid of an arbitrary closed polygon, as well as various other shapes such as circles, ellipses and parabolic segments. Therefore, where the subregion is defined using vector elements, or where the subregion is a convex hull, the centroid can be computed at a relatively low computational cost using the appropriate formulae. In cases where a subregion is not formed of polygons or simple shapes, for example where the subregion is defined as a pixel cluster, the centroid can be computed using numerical integration techniques such as Monte Carlo integration.

In cases where a subregion is defined as a polygon, for example where the subregion is a convex hull, the area of the subregion can be computed by decomposing the polygon into triangles and summing the areas of the triangles. In cases where a subregion is not formed of polygons or simple shapes, the area is proportional to a number of pixels within the subregion, which may be determined directly by pixel counting, or estimated using numerical sampling techniques.

It is possible that the convex hulls of two or more pixel clusters partially or wholly overlap one another. In such cases, the area of the underlying subregion may be computed by calculating the area of the underlying convex hull and subtracting the area of the overlapping portion of the overlying convex hull. The position of the centroid of the underlying subregion may then be computed by application of the method of geometric decomposition to the underlying convex hull and the overlapping portion of the convex hulls.

The system 500 determines, at 606, a respective weight value for each of the identified subregions. The weight value for a given subregion depends at least on the area of the subregion, and may increase in magnitude with the area of the subregion. The weight value may for example be proportional to the area of the subregion or may depend on the area in dependence on another functional relationship, for example in proportion to a square root or sigmoid function of the area. In the case of a sigmoid function, the weight of a subregion saturates to a fixed value as the area of the subregion increases, limiting the maximum magnitude of the weight value even for particularly large subregions. The weight value may further depend on other factors such as the shape of the subregion. For example, the weight value may increase or decrease in dependence on a ratio of the height to the width of the subregion (the aspect ratio). The weight value of a subregion may additionally or alternatively depend on colour values of pixels or vector elements within the subregion. Determining a weight value may involve first determining a colour density for the subregion, the colour density being characteristic of the colour and/or brightness of pixels or elements within the subregion. The colour density may depend on one or more colour components of pixels within the subregion. In one example, the colour density depends on the luminance (brightness) of the pixels within the subregion. The colour density may for example be proportional to, inversely proportional to, or otherwise functionally dependent on the average luminance of pixels within the subregion. The colour density may alternatively depend on a particular colour component of pixels within the image, for example assigning a higher colour density to subregions containing pixels with a higher average red component, or may depend on a metric distance between an average colour of pixels in the subregion and a colour of a background on which the images are to be presented. By making the weight value for a subregion dependent on a colour density for the subregion, the flexibility of the method is improved. By choosing a suitable definition for the colour density, subregions having certain characteristics can be chosen to have a greater influence on the final position of the image. The definition will depend on, for example, whether the background on which the images are presented is light or dark, whether the background is coloured, and/or whether objects having specific properties are deemed to have a greater importance than others, for example depending on the function of those objects in a GUI. The definition of the colour density also allows certain objects or features within an image to have no effect on the final positioning of the images, for example those associated with a background of the images.

Having determined a colour density for a subregion, the weight value may then depend on the determined colour density and the area of the subregion. For instance, the weight value may be proportional to a product of the colour density and the area. Subregions which are larger and/or have a higher colour density will have a greater effect on the final position of the image. Weight values of subregions having an area less than a predetermined threshold area (which may be predetermined or may depend on the areas of the subregions of the image) may optionally be set to zero. This reduces the processing demand for implementing the method by effectively ignoring subregions which are too small to have a significant effect on the final position of the image. This may be particularly important for example where images have a patterned background.

The system 500 determines, at 608, a position of an anchor point within the image in dependence on the weight values and the positions of the centroids of the identified one or more subregions of the image. The position of the anchor point may for example be determined as a weighted average of the positions of the centroids, where the weighting is proportional to the weight values of the one or more subregions.

FIG. 7 shows an example of an image 700 in which two subregions are identified: a rectangular subregion 702 with a centroid 704, and a triangular subregion 706 with a centroid 708. The centre 710 of the image 700 is also shown, along with an anchor point 712 determined in accordance with the present method. In this example, the weight values for the subregions 702, 706 depend on the areas of the subregions 702, 706, and furthermore the weight values are proportional to the areas of the subregions 702, 706. It is observed that the rectangular subregion 702 has a greater area, and therefore a greater weight value, than the triangular subregion 706. As a result, the position of the anchor point is biased towards the position of the rectangular subregion 702. More particularly, in this example the anchor point 712 is offset from the image centre 710 and lies closer to the centroid 704 of the rectangular subregion 702 than to the centroid 708 of the triangular subregion 706.

Figure 8:
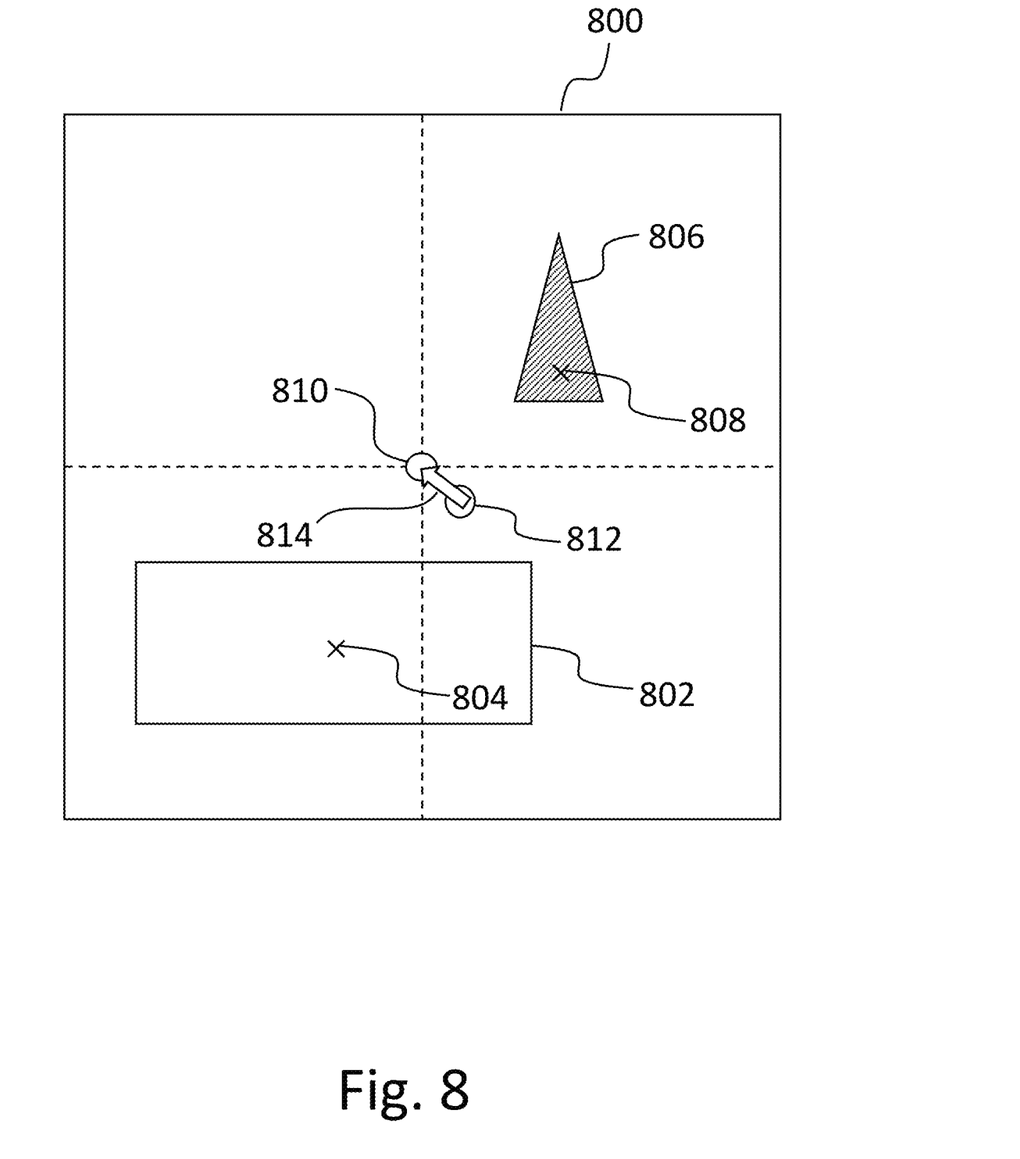
FIG. 8 illustrates schematically a second example of an offsetting of an image representing two objects in accordance with the present disclosure.

FIG. 8 shows a further example of an image 800 in which two subregions are identified: a rectangular subregion 802 with a centroid 804, and a triangular subregion 806 with a centroid 808. The centre 810 of the image 800 is also shown, along with an anchor point 812 determined in accordance with the present method. The weight values for the subregions 802, 806 are proportional to the areas of the subregions 802, 806. In this example, the weight values are also proportional to colour densities associated with the subregions 802, 806. The colour density associated with the triangular subregion 806 (shown in FIG. 8 with hatching to indicate a different colour to the rectangular subregion 802) is greater than the colour density associated with the rectangular subregion 802. In this example, the weight values of the rectangular subregion 802 and the triangular subregion 806 are similar. As a result, the anchor point 812 is approximately equidistant from the centroid 804 of the rectangular subregion 802 and the centroid 808 of the triangular subregion 806.

The system 500 determines, at 612, an offset direction for transposing or offsetting the image from its initial position. The offset direction is parallel to a vector from the anchor point of the image to the image centre (which, as noted above, may be taken to be a centroid of the image or a centre of a smallest bounding polygon for the image). By transposing the image from its initial position in the offset direction, the anchor point of the image moves closer to the original position of the image centre. The image is thereby offset from its original position and is centred or partially centred in dependence on the locations and characteristics of the objects within the image, rather than in dependence on the overall size and shape of the image. FIGS. 7 and 8 include arrows 714, 814 representing vectors from the respective anchor points 712, 812 to the image centres 710, 810. The directions of the arrows 714, 814 represent the offset directions determined for the images 700, 800.

The system 500 performs the processing steps 602 to 610 for each image in the set of images, such that a respective offset direction is determined for each image. Depending on the available processing resources and time constraints, the processing of the images according to steps 602 to 610 may be performed in sequence or in parallel using multiple processor cores. Having determined an offset direction for each image, the system 500 transposes, at 612, the images from their respective initial positions in the respective determined offset directions. The transposing of an image is a geometric translation of the position of the image, resulting in the moving or offsetting of the image from its initial position. Performing the transposing results in transposed image data indicating a final position in the image plane for each of the images in the set. The transposing may further include generating a composite image formed of all of the images in the set in their indicated final positions. In some examples, such as when a user designs a layout of a GUI with the assistance of the present method, the transposing of the images may be displayed for the user on a display device, for example in an animated fashion. In contrast with steps 602 to 610, which are looped over the images in the set (either in series or parallel), the transposing at 612 may be performed in a single step for all of the images in the set.

The images may be transposed until the anchor point of each image is positioned where the centre of that image was initially positioned. For example, where the images are initially positioned on a grid 102 as shown in FIGS. 1 and 2, such transposing results in the anchor points lying on the vertices of the grid 102. The resulting arrangement is shown in FIGS. 3 and 4, where it is assumed that the weight value of the subregions depend on the areas of the subregions. The resulting positioning may be considered an optimal positioning with respect to the positions of the identified subregions. However, it may not be possible or desirable for all of the images to be transposed to this extent.

In some examples, at least some of the images in the set may be transposed by a distance depending on user input received from an input device. For example, the system 500 may receive user input indicative of an offset factor for one, some, or all of the images in the set, and at 612 may transpose those images by a distance depending on the offset factor, for example by a distance proportional to the offset factor. By giving a user control over the magnitude of the offsets, the user is able to decide to what extent to allow the images to be repositioned in accordance with the present method. A user may for example be presented with a slider, dial, or other input means for controlling the offset factor of one or more of the images. One end of the slider (corresponding to an offset factor of zero) may result in no repositioning of the one or more images. The other end of the slider (corresponding to an offset factor of one) may result in the one or more images being transposed until the anchor points of the one or more images are positioned where the image centres were initially positioned. The user may be able to select whether the slider applies to all of the images, a subset of the images, or just one image at a time. The images may for example be presented on a display along with the slider, such that when the user adjusts the position of the slider, the transposing of the selected images is displayed in real time. In this way, the user is provided with a level of control over the transposing operation, whilst still avoiding the time-consuming task of manually adjust the position of each image.

In some cases, the transposing described above may result in some of the images, or objects appearing within some of the images, overlapping one another, which may be unacceptable for example in the case of a GUI. In view of this, the transposing of images at 612 may be performed in such a way to avoid overlapping of identified subregions, or to ensure a minimum distance between identified subregions of any two images. In cases where the subregions are identified as convex hulls of pixel clusters, enforcing a minimum separation between subregions will also enforce at least the same minimum separation between the pixel clusters. Once an offset direction has been determined for each of the images, the transposing may be applied in increments up to a maximum offset distance (for example as determined by an offset factor). During each incremental offset, a collision check may be performed to ensure that the minimum distance between subregions of any pair of neighbouring images does decrease below a threshold distance. If the distance does decrease below the threshold distance, then that pair of images may be transposed no further. Other collision avoidance methods may be performed, for example by defining a differentiable function of the variable offset distances, including a first term penalising differences between the variable offset distances and the maximum offset distances, and a second term penalising a proximity between subregions of adjacent images. Automatic differentiation may then be used to determine a set of offset distances that minimises the differentiable cost function.

Figure 9:
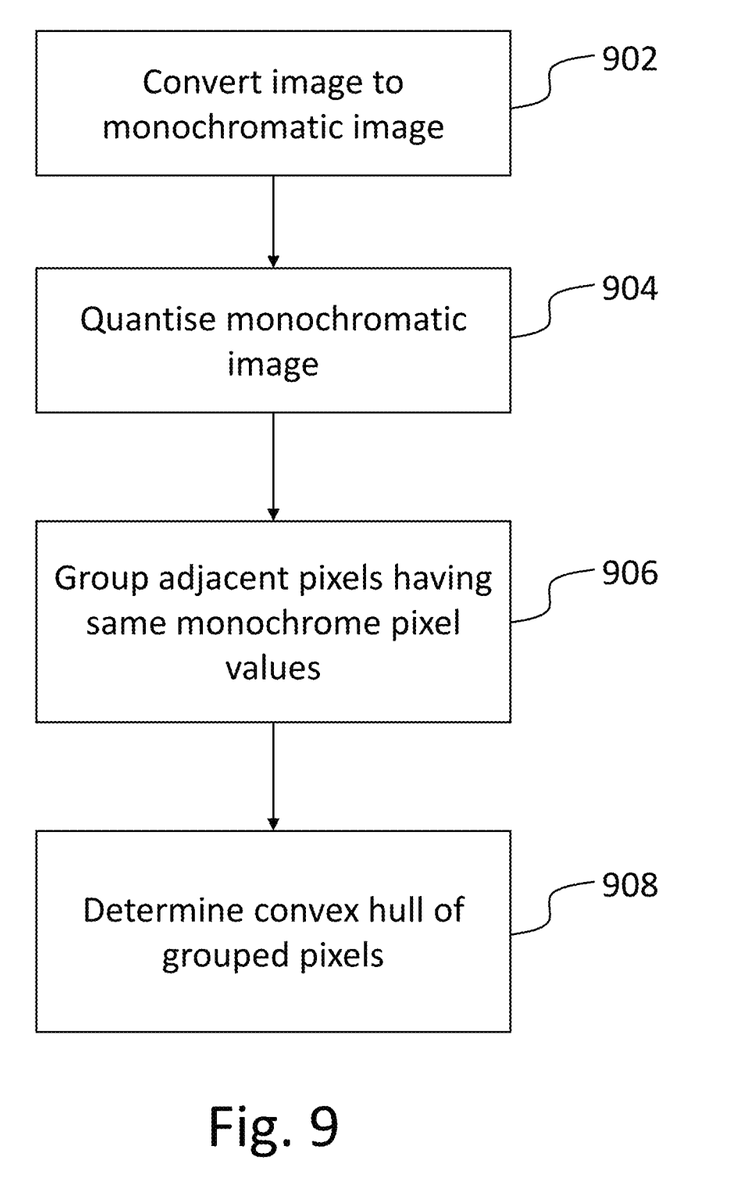
FIG. 9 shows an example of a method of determining subregions of an image in accordance with the present disclosure.
Figure 10:
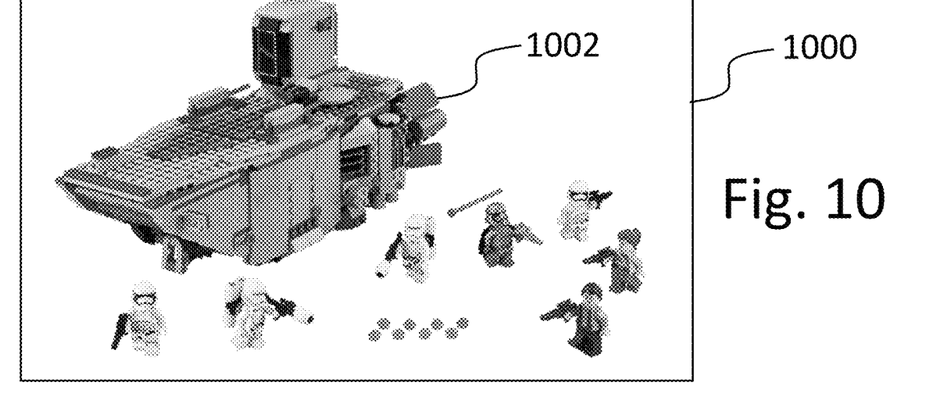
FIG. 10 shows an example of a greyscale image representing a set of objects.

FIG. 9 shows an example of a method performed by the data processing system 500 to identify subregions of a rasterised colour image. The system 500 converts, at 902, the image into a monochromatic or greyscale image. In other words, multiple pixel values representing different colour components for each pixel are converted to a single monochromatic pixel value, for example using colorimetric conversion in which pixel luminance is preserved or luma coding as commonly used in video systems. FIG. 10 shows a monochromatic (greyscale) image 1000 which has been converted from a colour image (not shown). The monochromatic image 1000 includes eighteen separate objects on a white background, including a largest object 1002. In cases where the present method is applied to images that are already monochromatic, step 902 can be omitted.

Figure 11:
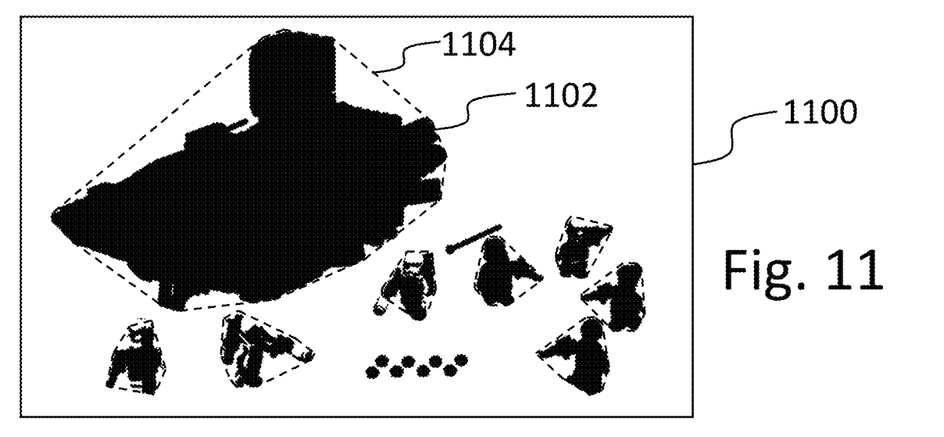
FIG. 11 shows the greyscale of FIG. 10 converted to a quantised monochromatic image.

The system 500 quantises, at 904, the monochromatic image to generate a quantised monochromatic image. In any monochromatic image, pixels are restricted to having a predetermined number of possible monochromatic pixel values, for example 32 possible values in the case of a 4-bit monochromatic image, 256 possible values in the case of an 8-bit monochromatic image, and $2^n$ possible values in the case of an n-bit monochromatic image. Quantising a monochromatic image means mapping the pixel values of the image to a set of lower precision pixel values. This mapping may be achieved by grouping the possible pixel values in bins each corresponding to a new quantised pixel value. Quantising a 4-bit monochromatic image to a 2-bit monochromatic image may then involve mapping pixel values to 0, pixel values 8-15 to 1, pixel values 16-23 to 2, and pixel values 24-31 to 3. The quantisation thresholds defining the bins may be equally spaced such that the bins are of equal in width, or the quantisation thresholds may be modified such that at least some of the bins have different widths to one another. In the context of the present disclosure, quantising may involve converting the image to a 1-bit monochromatic image with 2 possible pixel values (a binary image), a 2-bit monochromatic image with 4 possible pixel values, or any other suitable pixel values. In some examples, the step of quantising the pixel values may be omitted, for example where the image already uses a low-bit colour format. FIG. 11 shows a binary image 1100 resulting from quantising the greyscale image 1000 of FIG. 10 with a quantisation threshold chosen such that most pixel values (other than those representing white or having a luminance close to that of white) appear black in the binary image 1100. It is observed that hat the binary image includes black objects on a white background, including a largest black object 1102 corresponding to the object 1002 in the monochromatic image 1000.

The system 500 groups, at 906, adjacent pixels having common quantised monochromatic pixel values, resulting in one or more clusters of contiguous pixels each having a common associated pixel value. Adjacent or neighbouring pixels may be defined as pixels immediately to either side, or above or below a given pixel. Optionally, adjacent pixels may further include pixels diagonally adjacent to a given pixel. The grouping may involve labelling each pixel with an integer value representative of a group to which the pixel is allocated. In the example of the image 1100, there are several pixel clusters containing black pixels, including a pixel cluster corresponding to the object 1102, and several pixel clusters containing white pixels. In order to avoid erroneous breaking up of pixel groups due to rapid pixel variation caused by textures, visual noise, or edge effects within an image, an additional blurring step may be carried out in which a blurring filter or low-pass filter, such as a averaging filter or a Gaussian blur filter, is applied to the original or monochromatic image before quantisation.

Figure 12:
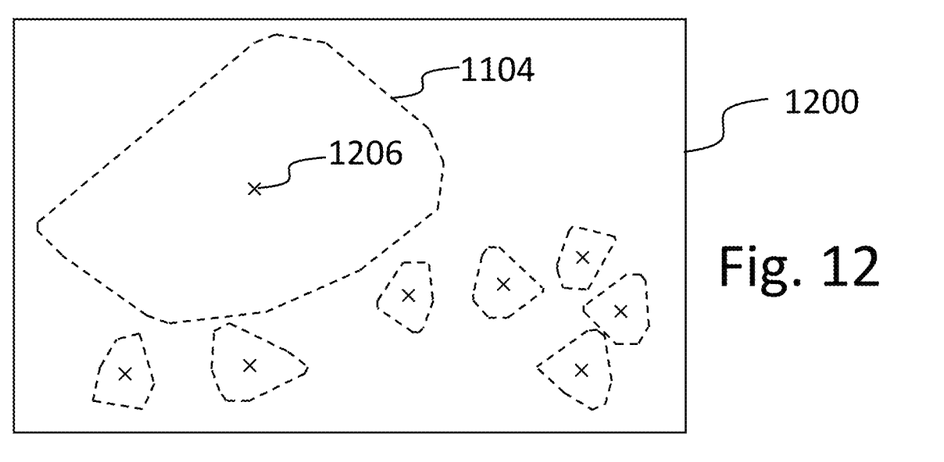
FIG. 12 shows an example of a set of subregions identified in the image of FIG. 10.

The system 500 determines, at 908, a convex hull for at least some of the pixel clusters. The determined convex hulls are the subregions of the image. In cases where the image includes a background, a convex hull may not be determined for pixel clusters associated with the background, or pixel clusters having the same pixel value as pixel clusters associated with background. Furthermore, the determination of a convex hull may be omitted for pixel clusters having below a threshold number of pixels. In the example of the image 1100, dashed lines are used to represent subregions corresponding to convex hulls determined for some of the clusters of black pixels. The subregion 1104 in this example is determined as the convex hull of the pixel cluster corresponding to the object 1102. It is observed that no convex hull is determined for some of the smaller pixel clusters. FIG. 12 shows the subregions of FIG. 11, including the subregion 1104, along with crosses representing the centroids of the subregions, including the centroid 1206 of the subregion 1104.

The above embodiments are to be understood as illustrative examples. Further embodiments are envisaged. For example, the methods described above may be used to train a machine learning regression model to process a set of images to determine a spatial arrangement of the image. The training may be performed using supervised learning, with the images as input data and the offsets of the image positions determined using the present method as labelled training data. Furthermore, the methods described herein may be applied in contexts other than GUIs, for example as a tool for use in design applications, or as a pre-processing step for real time rendering of scenes in video games or virtual/augmented reality applications. The principles of the method may be applied to three-dimensional scenes, for example with polyhedrons within a three-dimensional scene taking the place of subregions.

It is to be understood that any feature described in relation to any one embodiment may be used alone, or in combination with other features described, and may also be used in combination with one or more features of any other of the embodiments, or any combination of any other of the embodiments. Furthermore, equivalents and modifications not described above may also be employed without departing from the scope of the disclosure, which is defined in the accompanying claims.

The invention claimed is:

1. A system comprising:
   at least one processor; and
   at least one non-transitory computer-readable medium storing instructions which, when executed, cause the at least one processor to perform operations comprising:
   for each image in a set of images:
      obtaining data indicative of a respective initial position of the image within an image plane;
      processing the image to identify one or more subregions of the image;
      determining an area and a centroid of each of the identified one or more subregions;
      determining, for each of the identified one or more subregions, a weight value depending on the determined area of that subregion;
      determining a position of an anchor point within the image in dependence on the weight values and positions of the centroids of the determined one or more subregions; and
      determining a respective offset direction from the determined anchor point to a centre of the image; and
   transposing the images in the set from the respective initial positions of the images, in the respective offset directions,
   whereby the transposing of the images from the respective initial positions of the images determines a spatial arrangement for the set of images for display by a display device.

2. The system of claim 1, wherein the anchor point within each image is determined as an average position of the centroids of the identified one or more subregions of the image, weighted by the weight values of the determined one or more subregions of the image.

3. The system of claim 1, wherein for each image of the set of images, the weight value for each of the determined one or more subregions further depends on a color density associated with that subregion.

4. The system of claim 1, wherein:
   one or more of the images of the set of images comprises a respective plurality of pixels; and
   for each of said one or more images:
      the one or more subregions of the image are identified in dependence on pixel values of the pixels within the image; and
      each of the one or more subregions comprises a respective pixel cluster comprising a subset of the pixels within the image.

5. The system of claim 4, wherein for each of said one or more images, the weight value for each of the identified one or more subregions depends on the pixel values of at least some of the pixels within said respective pixel cluster.

6. The system of claim 4, wherein for each of said one or more images, determining a subregion of the image comprises:
   converting the image to a quantised monochrome image comprising pixels restricted to having a predetermined number of monochrome pixel values; and
   grouping adjacent pixels having a same monochrome pixel value.

7. The system of claim 6, wherein the predetermined number of monochrome pixel values is two.

8. The system of claim 6, wherein for each of said one or more images, converting the image to the quantised monochrome image comprises applying a blurring filter.

9. The system of claim 4, wherein for each of said one or more images, identifying a first subregion of the image comprises determining a convex hull of a first pixel cluster of the determined one or more pixel clusters.

10. The system of claim 9, wherein:
    the determined one of more pixel clusters is a plurality of pixel clusters;
    said convex hull is a first convex hull;
    identifying a second subregion of the image comprises determining a second convex hull of a second pixel cluster of the plurality pixel clusters, the second convex hull at least partially overlapping the first convex hull;
    determining the area of the second subregion comprises subtracting an area of a portion of the first convex hull overlapping the second convex hull; and
    determining the centroid of the second subregion comprises applying the method of geometric decomposition to the second convex hull and the portion of the first convex hull overlapping the second convex hull.

11. The system of claim 1, wherein the transposing of the images is performed in a single step.

12. The system of claim 1, wherein transposing the images comprises transposing the images until the anchor point of each image is located at an initial position of the centre of that image.

13. The system of claim 1, wherein the operations further comprise receiving user input indicating an offset factor for at least one of the set of images,
    wherein transposing said at least one of the set of images comprises transposing said at least one of the set of images by a distance depending on the indicated offset factor.

14. The system of claim 1, wherein:
    transposing the images comprises incrementally and simultaneously transposing the images in the set; and
    the incremental transposing of any two of the images is ceased when a minimum distance between subregions of said two of the images is less than a threshold distance.

15. The system of claim 1, wherein transposing each image comprises transposing each image by a respective offset distance that minimises a differentiable function of the offset distances, the differentiable function comprising:
    a first term penalising, for each image, a difference between the offset distance for that image and a respective maximum offset distance for that image; and a second term penalising, for each pair of adjacent images, a minimum distance between identified subregions of that pair of adjacent images.

16. The system of claim 1, wherein obtaining the respective initial position of the centre of each image of the set of images comprises allocating the centre of each image of the set of images to a respective vertex of a grid spanning at least a portion of the image plane.

17. The system of claim 1, wherein the operations further comprise rendering the set of images for display on the display device in accordance with the determined spatial arrangement.

18. The system of claim 17, further comprising determining a mapping of the set of images, arranged in accordance with the determined spatial arrangement, to a surface of a three-dimensional structure,
wherein rendering the set of images for display on the display device comprises rendering a projection of the surface of the three-dimensional structure with the set of images positioned thereupon in accordance with the determined mapping.

19. A computer-implemented method comprising:
for each image in a set of images:
obtaining data indicative of a respective initial position of the image within an image plane;
processing the image to identify one or more subregions of the image;
determining an area and a centroid of each of the identified one or more subregions;
determining, for each of the identified one or more subregions, a weight value depending on the determined area of that subregion;
determining a position of an anchor point within the image in dependence on the weight values and positions of the centroids of the determined one or more subregions; and
determining a respective offset direction from the determined anchor point to a centre of the image; and
transposing the images in the set from the respective initial positions of the images, in the respective offset directions,
whereby the transposing of the images from the respective initial positions of the images determines a spatial arrangement for the set of images for display by a display device.

20. One or more non-transitory storage media storing instructions which, when executed by a computer, cause the computer to perform operations comprising:
for each image in a set of images:
obtaining data indicative of a respective initial position of the image within an image plane;
processing the image to identify one or more subregions of the image;
determining an area and a centroid of each of the identified one or more subregions;
determining, for each of the identified one or more subregions, a weight value depending on the determined area of that subregion;
determining a position of an anchor point within the image in dependence on the weight values and positions of the centroids of the determined one or more subregions; and
determining a respective offset direction from the determined anchor point to a centre of the image; and
transposing the images in the set from the respective initial positions of the images, in the respective offset directions,
whereby the transposing of the images from the respective initial positions of the images determines a spatial arrangement for the set of images for display by a display device.

* * * * *